United States Patent
Kim et al.

(10) Patent No.: US 8,372,543 B2
(45) Date of Patent: Feb. 12, 2013

(54) COPPER COLLECTOR FOR SECONDARY BATTERY COMPRISING CU-NITRILE COMPOUND COMPLEX FORMED ON SURFACE THEREOF

(75) Inventors: Young Soo Kim, Daejeon (KR); Soon Ho Ahn, Daejeon (KR); Mi Young Son, Seongnam-Si (KR)

(73) Assignee: LG CHEM, Ltd., Seoul (KR)

( * ) Notice: Subject to any disclaimer, the term of this patent is extended or adjusted under 35 U.S.C. 154(b) by 0 days.

(21) Appl. No.: 13/461,581

(22) Filed: May 1, 2012

(65) Prior Publication Data

US 2012/0214058 A1    Aug. 23, 2012

Related U.S. Application Data

(63) Continuation of application No. 11/292,711, filed on Dec. 1, 2005, now Pat. No. 8,192,872.

(30) Foreign Application Priority Data

Dec. 2, 2004 (KR) .................. 10-2004-0100595

(51) Int. Cl.
H01M 4/64 (2006.01)
H01M 4/66 (2006.01)
H01M 4/68 (2006.01)
B05D 5/12 (2006.01)

(52) U.S. Cl. .................. 429/245; 429/233; 427/122
(58) Field of Classification Search .................. 429/245, 429/233; 427/122
See application file for complete search history.

(56) References Cited

U.S. PATENT DOCUMENTS

| 6,200,356 B1 | 3/2001 | Behl et al. |
| 2004/0013946 A1 | 1/2004 | Abe et al. |
| 2006/0035144 A1 | 2/2006 | Shimizu et al. |

FOREIGN PATENT DOCUMENTS

| JP | 11307102 A | 11/1999 |
| JP | 2000182623 A | 6/2000 |
| JP | 2004179146 A | 6/2004 |
| JP | 2005044664 A | 2/2005 |
| JP | 2006073513 A | 3/2006 |
| KR | 1020010023164 A | 3/2001 |
| KR | 1020060045320 A | 5/2006 |
| WO | 0213305 A1 | 2/2002 |

OTHER PUBLICATIONS

Fujimoto et al., "Charge-discharge Characteristics of Natural Graphite Electrode in Some Cyclic Carbonates"; The Electrochemical Society of Japan, 1997, vol. 65, No. 11, pp. 949-953.
Steiner U.B. et al., Adsorption of Alkanenitriles and Alkanedinitriles on Gold and Copper:, Sep. 1992, Langmuir, 8, 2771-2777.
Abe et al., Machine translation of JP2004179146A, Jun. 2004, JPO.
International Search Report issued in corresponding PCT/KR2005/004025 Dated Mar. 2, 2006.

*Primary Examiner* — Basia Ridley
*Assistant Examiner* — Sean P Cullen
(74) *Attorney, Agent, or Firm* — Birch, Stewart, Kolasch & Birch, LLP

(57) ABSTRACT

Disclosed are copper foil or net comprising a Cu-nitrile compound complex formed on the surface thereof, a method for preparing the same, and a lithium secondary battery that comprises an electrode using the same copper foil or net as a collector. The lithium secondary battery, which uses a copper collector comprising a Cu-nitrile compound complex formed on the surface thereof through the application of a certain voltage level, can prevent the corrosion of Cu occurring at a voltage of 3.6V or higher under overdischarge conditions away from the normal drive condition, and thus can significantly improve the capacity restorability after overdischarge.

6 Claims, 6 Drawing Sheets

COMP.EX.3

EX.3

COPPER COLLECTOR FOR SECONDARY BATTERY COMPRISING CU-NITRILE COMPOUND COMPLEX FORMED ON SURFACE THEREOF

CROSS REFERENCE TO RELATED APPLICATIONS

This application is a continuation application of U.S. application Ser. No. 11/292,711, filed on Dec. 1, 2005, which claims priority to and the benefit of Korean Patent Application No. 10-2004-100595, filed on Dec. 2, 2004 in Korea, both of which are hereby incorporated by reference in their entirety for all purposes as if fully set forth herein.

TECHNICAL FIELD

The present invention relates to copper foil or net comprising a Cu-nitrile compound complex formed on the surface thereof, a method for preparing the same, and a lithium secondary battery that comprises an electrode using the same copper foil or net as a collector.

BACKGROUND ART

Recently, as mobile communication industries and information electronic industries develop rapidly, a light-weight, high-capacity lithium secondary battery is increasingly in demand. In particular, a lithium secondary battery has the advantage of a higher drive voltage and a higher energy density compared to other conventional batteries. However, a lithium secondary battery that uses an organic electrolyte may ignite and explode, and thus a lithium secondary battery that meets with sufficient levels of safety becomes the focus of intention. To provide against overcharge or overdischarge occurring away from the normal drive condition of a lithium secondary battery, a protection circuit has been attached to a lithium secondary battery. However, protection circuits, PTCs or thermal fuses, attached to a lithium secondary battery for the purpose of safety, are not preferable. This is because they are expensive and take up large volume. Therefore, a battery having no protection circuit is very much in demand.

Meanwhile, the bare cells that have no protection circuits developed up to date, have a problem. They show a rapid drop in the capacity when they are subjected to a charge/discharge cycle again after an overcharge test. Moreover, when such bare cells are overdisharged to a voltage lower than an adequate voltage, they are not amenable to charge/discharge cycles any longer due to their remarkably decreased capacity in spite of an attempt to recharge them.

In the above case, rapid decrease in the capacity after overcharge results from the following reason. In general, voltage of a battery is defined by the potential difference between a cathode and an anode. When a battery is discharged continuously at low electric current after its voltage drops to a level lower than the normal voltage, the cathode voltage decreases gradually due to the consumption of Li ions in the anode. On the contrary, the anode voltage rapidly increases in advance of the cathode voltage, and finally reaches a voltage of 3.6V, where the copper foil used as an anode collector is oxidized. Thus, the copper foil is dissolved out in the form of copper ions, and contaminates the electrolyte. Then, the copper ions are reattached to the anode surface during the next charge cycle, and thus the anode active material is not utilizable any longer. Therefore, oxidation of copper foil results in a rapid drop in the capacity of a battery after overdischarge, and thus makes the battery useless.

To solve the above-mentioned problem, many attempts were made to inhibit the increase in anode voltage by decreasing cathode potential according to the prior art. For example, the SONY Corporation developed a method for preventing Cu in the copper foil used as an anode collector from reaching the potential causing the corrosion of Cu. The SONY corporation's method comprised incorporating a material with a low discharge voltage (i.e. a material capable of decreasing the cathode voltage rapidly), such as olivine or a nickel-containing material, into the cathode active material, so that the cathode voltage decreased rapidly at the last stage of discharge to complete discharge as early as possible. However, such a change in the cathode active material caused degradation of battery quality, such as gas formation at high temperature. Therefore, development of a novel method for preventing dissolution of Cu while maintaining the overall quality of a battery is required.

DISCLOSURE OF THE INVENTION

Therefore, the present invention has been made in view of the above-mentioned problems. The present inventors have found that when a voltage (sensed by Cu foil relative to Li metal) is applied to copper foil coated with a nitrile-based compound to a level of 1.9V, a Cu-nitrile compound complex is formed. We have also found that when the copper foil comprising the complex formed as described above is used as an anode collector for a lithium secondary battery, it is possible to significantly improve the capacity restorability of the battery after overdischarge, while not causing any degradation of the battery quality in normal use. The present invention is made based on these findings.

According to an aspect of the present invention, there is provided copper foil or net comprising a Cu-nitrile compound complex formed on the surface thereof. According to another aspect of the present invention, there is provided a method for preparing the above copper foil or net. According to still another aspect of the present invention, there is provided a lithium secondary battery that comprises an electrode using the above copper foil or net as a collector.

Hereinafter, the present invention will be explained in more detail.

The present inventors have made intensive research into a lithium secondary battery, and have found that when a certain range of reduction potentials is applied to copper, a specific group of compounds forms a complex on the surface of Cu.

FIG. 1 is a schematic view showing the formation of a typical complex. The non-covalent electron pair present on the cyano group (—CN) of a nitrile compound forms a coordination bond with Cu to provide a complex. Herein, the nitrile compound is subjected to the reduction potential of Cu on the surface of Cu metal, thereby forming a complex with Cu (see FIGS. 2, 3 and 4). Therefore, it is preferable that a voltage is applied to Cu metal to at least 1.9V based on Li metal, so as to complete the formation of a complex.

In general, copper used as an anode collector is corroded at a voltage of 3.6V or higher based on Li metal. Therefore, when a battery is discharged to a voltage lower than the normal voltage, i.e. when a battery is overdischarged, potential of the Cu collector increases to 3.6V or higher, resulting in corrosion of the Cu collector. Therefore, the battery quality is significantly degraded under the normal drive condition.

Copper metal comprising a Cu-nitrile complex formed on the surface thereof according to the present invention is not corroded even at a potential significantly higher than 3.6V (i.e. oxidation potential of Cu, where Cu is corroded) (see FIG. 5). Therefore, a lithium secondary battery using the copper metal comprising a Cu-nitrile compound complex formed on the surface thereof, as an anode collector, is effective for improving overdischarge characteristics.

The nitrile compound capable of forming a complex with Cu is a compound having a cyano group (—CN), and includes a compound represented by the formula of R—CN or CN—R—CN (wherein R is an alkyl group). Herein, R is derived preferably from a $C_2$~$C_{15}$ alkane. When the above nitrile compound is incorporated into a battery, there is little possibility of an irreversible reaction occurring in the battery, because alkyl groups have no reactivity. Therefore, use of such nitrile compounds causes no degradation of the battery quality.

Preferably, the nitrile compound is a dinitrile compound.

Non-limiting examples of the nitrile compound include succinonitrile (R=$C_2H_4$), glutaronitrile (R=$C_3H_6$), adiponitrile (R=$C_4H_8$), pimelonitrile (R=$C_5H_{10}$), octanedinitrile (R=$C_6H_{12}$), azelonitrile (R=$C_7H_{14}$), sebaconitrile (R=$C_8H_{16}$), 1,9-dicyanononane (R=$C_9H_{18}$), dodecanedinitrile (R=$C_{10}H_{20}$), or the like.

The copper foil or net, comprising a Cu-nitrile compound complex formed on the surface thereof, according to the present invention is obtained by the method comprising the steps of: dipping copper foil or net into a nitrile compound-containing solution, or coating copper foil or net with the same solution; and applying the reduction potential of Cu, for example a potential of 1.9V based on lithium, to the copper foil or net.

Concentration of the nitrile compound, needed for the formation of Cu-nitrile compound complex, is in proportion to the surface area of Copper foil or net. However, it is preferable that the nitrile compound-containing solution (including an electrolyte) has a concentration of 0.1 wt % to 10 wt %.

Although there is no particular limitation in the solvent that may be used in the nitrile compound-containing solution, conventional non-aqueous electrolytes for lithium secondary batteries may be used. Non-limiting examples of the solvent include cyclic carbonates and linear carbonates. Typical examples of the cyclic carbonate include ethylene carbonate (EC), propylene carbonate (PC), gamma-butyrolactone (GBL), or the like. Typical examples of the linear carbonate include diethyl carbonate (DEC), dimethyl carbonate (DMC), ethyl methyl carbonate (EMC), or the like.

A lithium secondary battery, to which an electrode including a collector comprising a Cu-nitrile compound complex on the surface of Cu may be applied, according to the present invention, comprises:

(1) a cathode capable of lithium ion intercalation/deintercalation;

(2) an anode capable of lithium ion intercalation/deintercalation;

(3) a porous separator; and (4) a) a lithium salt, and b) a solvent for electrolyte.

In general, the lithium secondary battery comprises a lithium-containing transition metal oxide as a cathode active material. For example, the cathode active material is at least one selected from the group consisting of $LiCoO_2$, $LiNiO_2$, $LiMn_2O_4$, $LiMnO_2$ and $LiNi_{1-x}Co_xO_2$ (wherein 0<X<1). Additionally, carbon, lithium metal or alloys, or metal oxides capable of lithium intercalation/deintercalation and having a potential of less than 2V based on lithium (for example, $TiO_2$ and $SnO_2$) may be used as an anode active material. A non-aqueous electrolyte comprises a lithium salt, and non-limiting examples thereof include $LiClO_4$, $LiCF_3SO_3$, $LiPF_6$, $LiBF_4$, $LiAsF_6$, and $LiN(CF_3SO_2)_2$.

In a variant, the Cu-nitrile compound complex may be formed on a copper collector inside a lithium secondary battery. In this case, either or both of the cathode and anode comprise copper foil or net coated with an electrode active material, and a nitrile compound is added to the non-aqueous electrolyte or the electrode active material. Then, the reduction potential of Cu, for example a potential of 1.9V based on lithium, is applied to the copper collector.

The lithium secondary battery according to the present invention may be provided in the form of a cylindrical, prismatic or pouch-like battery.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

Cu foil for a non-aqueous secondary battery and Li metal were used as a working electrode and a reference electrode, respectively. The electrolyte was comprised of 1M $LiPF_6$ solution in a mixed solvent of EC, PC and DEC (EC:PC:DEC=3:2:5), and succinonitrile was added thereto in an amount of 3 wt % based on the total weight of the electrolyte. Cyclic voltammetry was performed by using the above system. Herein, voltage rate was 20 mV/s.

COMPARATIVE EXAMPLE 1

Cyclic voltammetry was performed in the same manner as described in Example 1, except that succinonitrile was not added to the electrolyte.

[Results for Cyclic Voltammetry]

Figure 1:
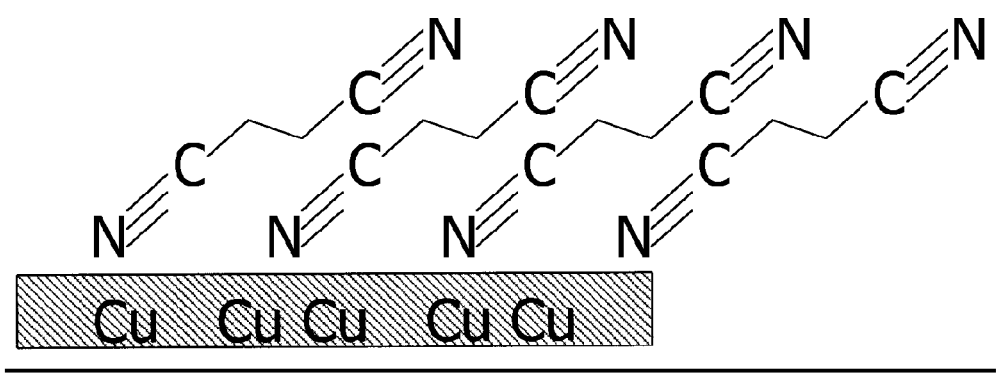
FIG. 1 is a schematic view showing a Cu-nitrile compound complex formed on the surface of a copper collector according to the present invention.
Figure 2:
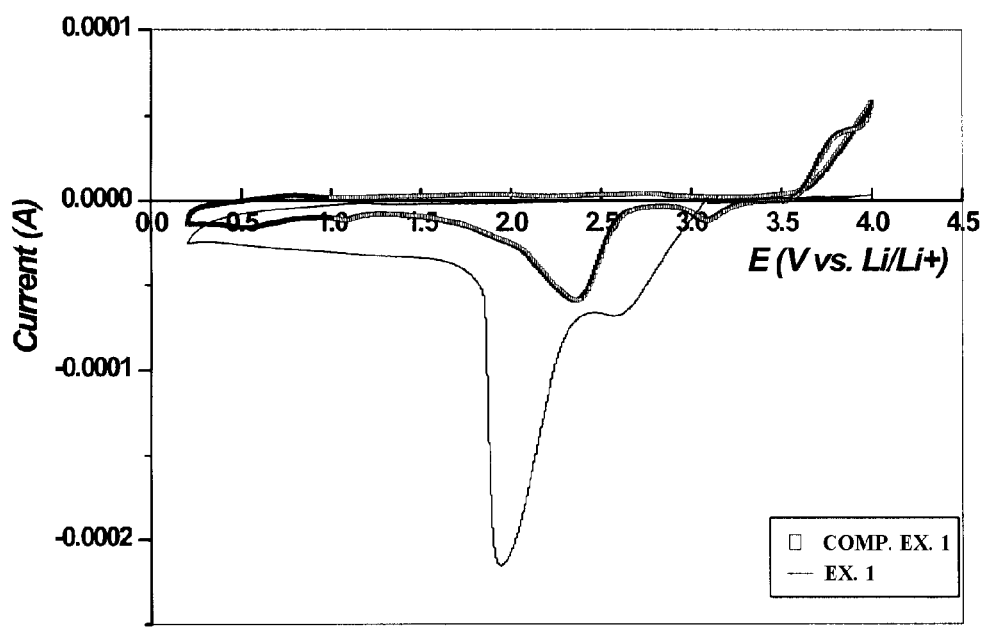
FIG. 2 is a graph showing the results for the cyclic voltammetry according to Example 1 and Comparative Example 1.

As shown in FIG. 2, when succinonitrile is present in the electrolyte (Example 1), a high reduction current flows in the vicinity of an anode potential of 1.9V based on Li metal. It can be estimated from the above result that a complex is formed between Cu and succinonitrile.

Figure 3:
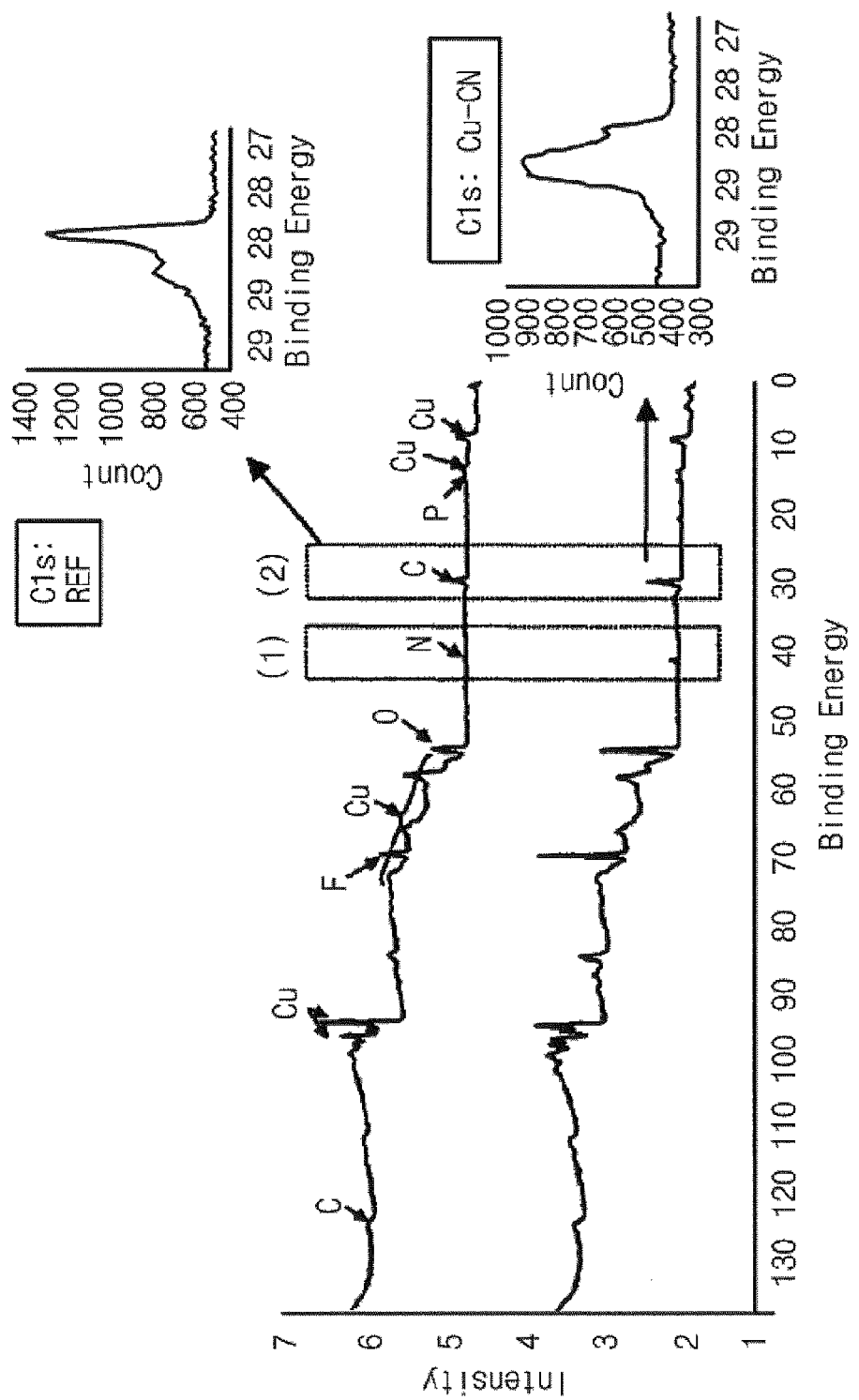
FIG. 3 is a graph showing the results for the surface analysis performed by X-ray Photoelectron Spectroscopy (XPS) for a Cu-nitrile compound complex formed on the surface of a copper collector according to the present invention.
Figure 4:
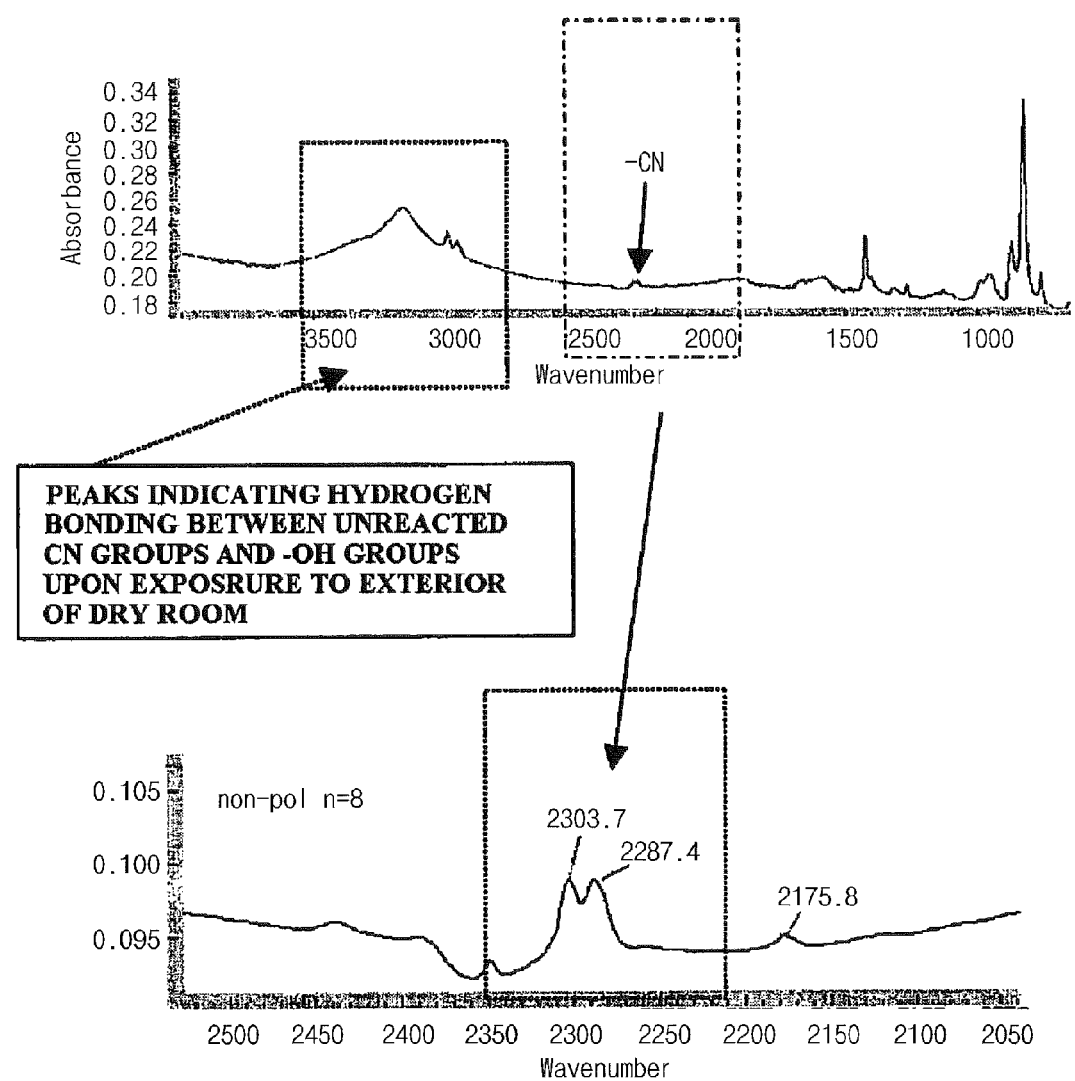
FIG. 4 is a graph showing the results for the Attenuated Total Reflection (ATR) spectroscopy, which illustrates the presence of bonding in the Cu—CN complex structure obtained by an electrochemical reaction.

The Cu foil, which was subjected to 1.9V in the succinonitrile-containing electrolyte according to Example 1, was further analyzed by way of X-ray Photoelectron Spectroscopy (XPS) and Attenuated Total Reflection (ATR) Spectroscopy. The results are shown in FIGS. 3 and 4. The graphs shown in FIGS. 3 and 4 demonstrate the formation of a Cu—CN complex structure. For example, as shown in FIG. 3 by the term of box (1), a large amount of nitrogen is detected on the Cu metal surface, which indicates the presence of a Cu—CN complex. Additionally, as shown in FIG. 3 by the term of box (2), it can be seen from the change in carbon peaks that a different form of CN group, i.e. a Cu—CN bond, is formed.

Further, it can be seen from FIG. 2 that when Cu forms a complex with a CN group, corrosion of Cu does not occur at a potential of 3.6V or higher, where the battery is overdischarged. In other words, because a Cu—CN coating film is formed on the Cu surface while the Cu foil is subjected to the reduction potential, the resultant Cu foil is stable even at a potential of 3.6V or higher, where corrosion of Cu occurs otherwise.

EXAMPLE 2

A conventional lithium secondary battery was manufactured by using $LiCoO_2$ as a cathode active material, artificial graphite as an anode active material, Al foil as a cathode collector, and Cu foil as an anode collector. Additionally, a tripolar cell was manufactured from the battery by using Li metal as a reference electrode. Herein, the electrolyte was comprised of 1M $LiPF_6$ solution in a mixed solvent of EC, PC and DEC (EC:PC:DEC=3:2:5), and succinonitrile was added thereto in an amount of 3 wt % based on the total weight of the electrolyte. Additionally, the copper collector was subjected to 1.9V by applying a voltage to the anode from 3V to 0V, because the voltage of the anode using the copper collector was 3V based on lithium metal (potential of copper).

Meanwhile, the full cell obtained as described above was discharged in a completely charged state, at a C-rate of 0.2 C to 2V, and at a C-rate of 1 mA to a voltage ranging from 2V to 0V.

COMPARATIVE EXAMPLE 2

A tripolar cell was manufactured and an overdischarge test was performed in the same manner as described in Example 2, except that succinonitrile was not added to the electrolyte.

[Results for Overdischarge Test 1]

In general, a tripolar cell for use in evaluating the quality of a battery uses lithium metal inserted into the cell as a reference electrode in addition to the cathode and anode of the cell. The tripolar cell is a test system, in which the voltage difference between the reference electrode (lithium metal) and the cathode, and the voltage difference between the reference electrode (lithium metal) and the anode are measured, so as to determine how the cathode and anode act against the reference electrode in an actual battery during charge/discharge cycles.

Figure 5:
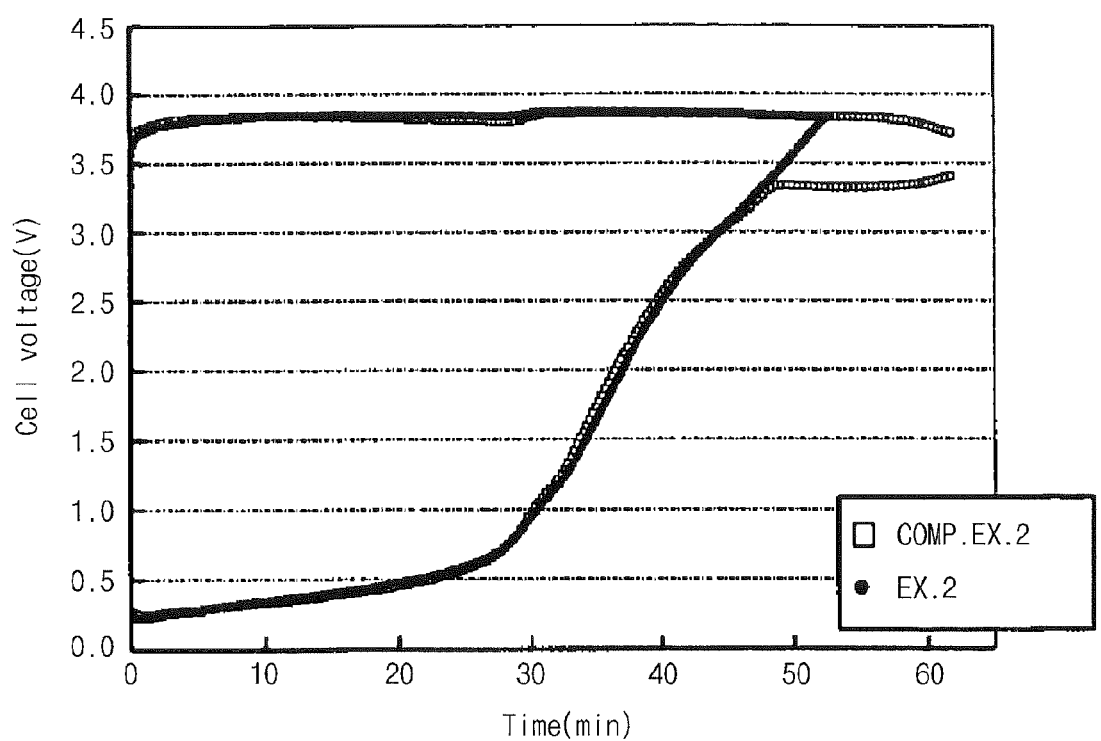
FIG. 5 is a graph showing the results for the overcharge test using a tripolar cell according to Example 2 and Comparative Example 2.

FIG. 5 shows the behaviors of the cathode and anode during an overdischarge cycle in a test using the above-mentioned tripolar cell. When comparing Example 2 with Comparative Example 2, the anode (Example 2) obtained by using a copper collector, which has been subjected to a reduction potential of 1.9V based on lithium metal in the succinonitrile-containing electrolyte, shows no corrosion even at a voltage of 3.6V or higher.

EXAMPLE 3

A tripolar cell was manufactured and an overdischarge test was performed in the same manner as described in Example 2, except that succinonitrile was added to the electrolyte in an amount of 5 wt % based on the total weight of the electrolyte. The overdischarge test was repeated three times. Additionally, the cell was discharged at 0.2 C under the normal drive condition before and after the overdischarge test.

COMPARATIVE EXAMPLE 3

A tripolar cell was manufactured and an overdischarge test was performed in the same manner as described in Example 3, except that succinonitrile was not added to the electrolyte.

[Results for Overdischarge Test 2]

Figure 6:
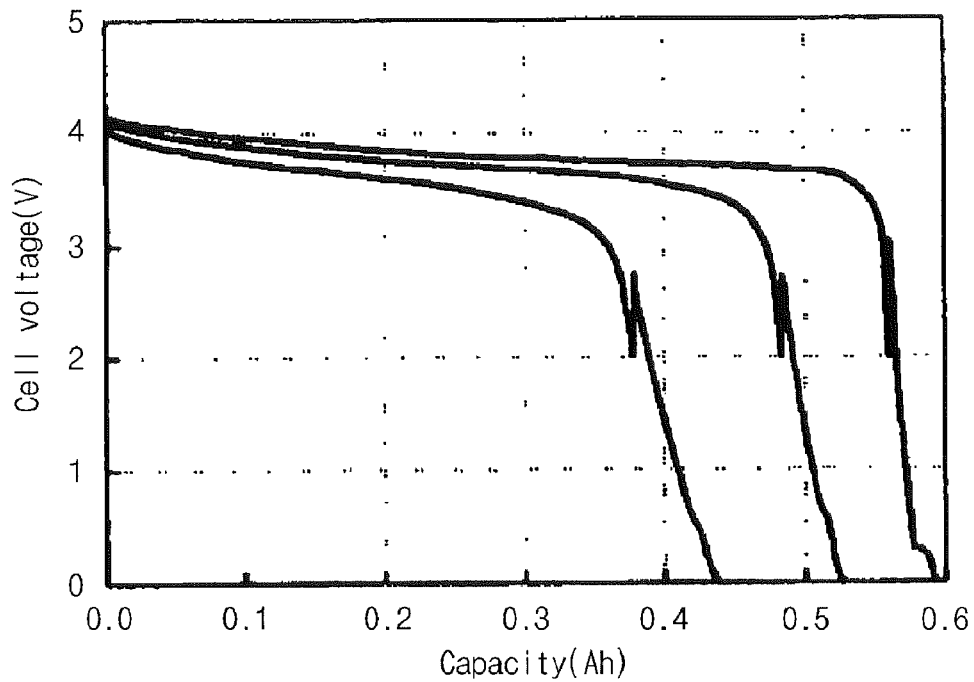
FIG. 6 is a graph showing the results for the overdischarge test according to Example 3 and Comparative Example 3.
Figure 6:
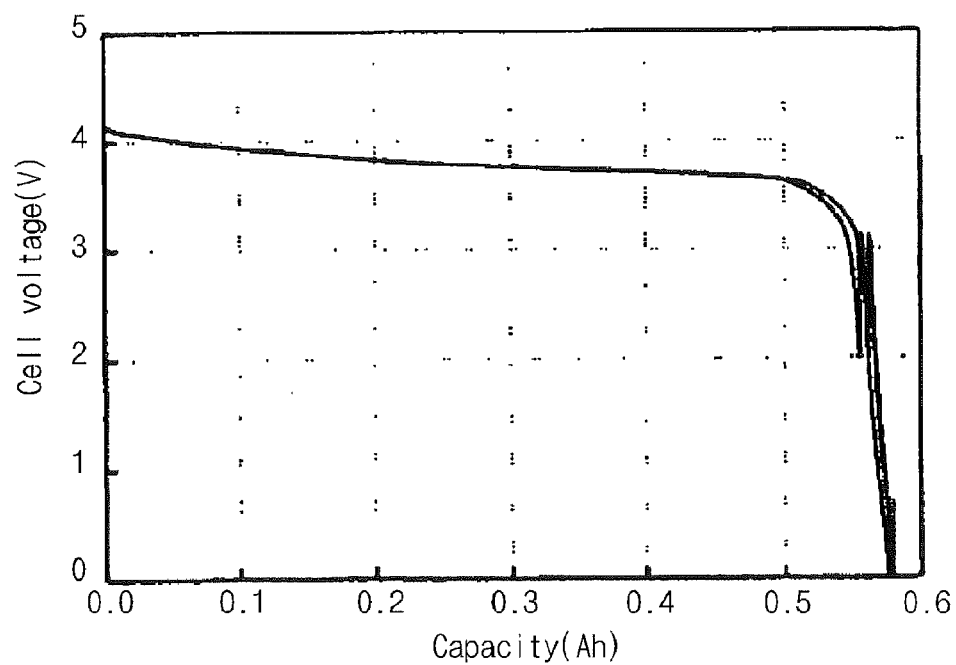

FIG. 6 shows the progress of overdischarge cycles. The cell (Example 3) that includes the anode comprising the copper collector, which has been subjected to a reduction potential of 1.9V based on lithium metal, shows no drop in the capacity during three charge cycles, contrary to the cell according to Comparative Example 3. This indicates that the anode in the cell according to Example 3 is not corroded.

Figure 7:
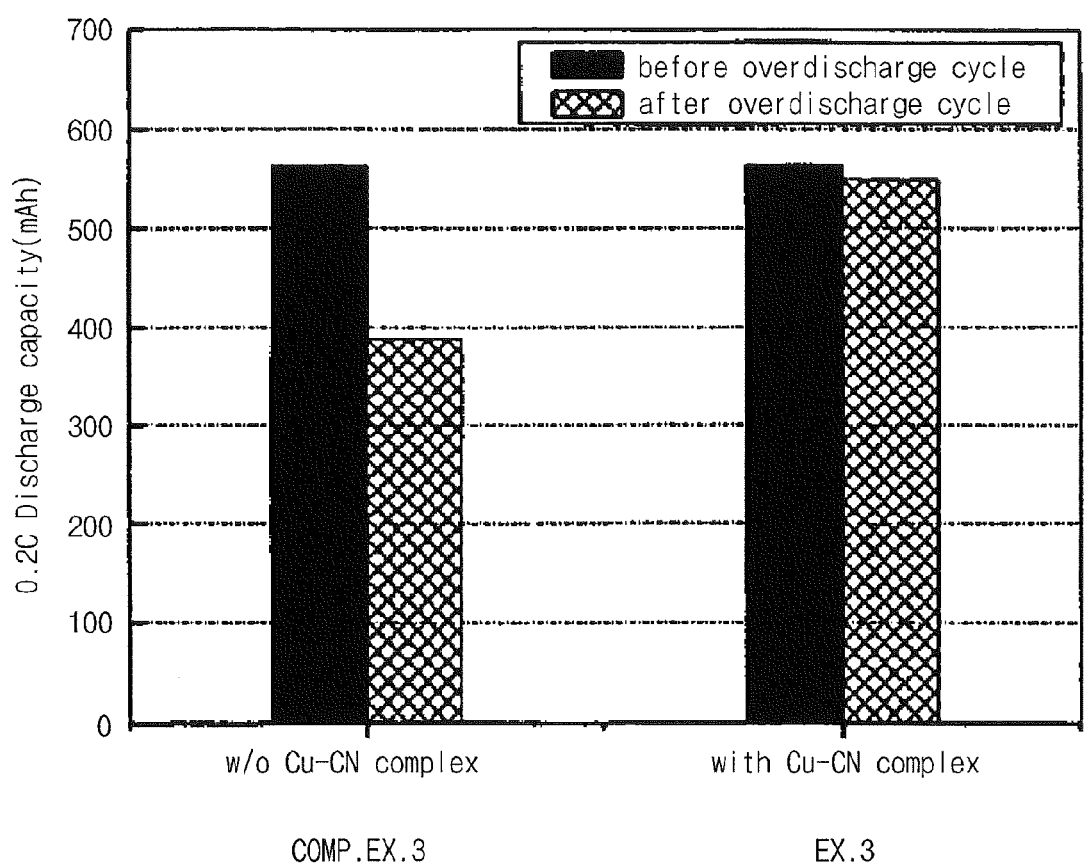
FIG. 7 is a graph showing the discharge characteristics before and after an overdischarge cycle according to Example 3 and Comparative Example 3.

FIG. 7 shows the capacity restorability after an overdischarge cycle. When comparing Example 3 with Comparative Example 3, the cell (Example 3) using the anode comprising a Cu-nitrile compound complex shows a high restorability of 90% based on the initial capacity. Additionally, as can be seen from FIG. 7, succinonitrile does not adversely affect the quality of an actual battery. This is because the discharge capacity of the cell (Example 3) using succinonitrile is similar to that of the cell (Comparative Example 3) using no succinonitrile, under the normal drive condition of an actual battery before the overdischarge test.

INDUSTRIAL APPLICABILITY

As can be seen from the foregoing, the lithium secondary battery according to the present invention, which uses a copper collector comprising a Cu-nitrile compound complex formed on the surface thereof through the application of a certain voltage level, can prevent the corrosion of Cu occurring at a voltage of 3.6V or higher under overdischarge conditions away from the normal drive condition. Therefore, the lithium secondary battery according to the present invention can significantly improve the capacity restorability after overdischarge.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. An electrode comprising:
   a copper foil or net;
   a Cu-nitrile compound complex coating film on an entire surface of the copper foil or net; and
   an electrode active material on the Cu-nitrile compound complex coating film.

2. The electrode according to claim 1, wherein the Cu-nitrile compound complex coating film is formed by subjecting a nitrile compound, which is disposed on the copper foil or net, to a reduction potential of less than or equal to 1.9 volts to greater than about 0.2 volts versus lithium metal.

3. The electrode according to claim 1, wherein the nitrile compound is a compound represented by the formula R—CN or CN—R—CN, wherein R is a $C_2$ to $C_{15}$ alkyl group or a $C_2$ to $C_{15}$ alkylene group.

4. A lithium secondary battery comprising:
   a) a cathode capable of lithium ion intercalation/deintercalation;
   b) an anode capable of lithium ion intercalation/deintercalation;
   c) a porous separator; and
   d) a non-aqueous electrolyte containing i) a lithium salt and ii) a solvent,
   wherein either or both of the cathode and the anode are the electrode as defined in claim 1.

5. The lithium secondary battery according to claim 4, wherein the Cu-nitrile compound complex coating film is formed by subjecting a nitrile compound, which is disposed on the copper foil or net, to a reduction potential of less than or equal to 1.9 volts to greater than about 0.2 volts versus lithium metal.

6. The lithium secondary battery according to claim 5, wherein the nitrile compound is a compound represented by the formula R—CN or CN—R—CN, wherein R is a $C_2$ to $C_{15}$ alkyl group or a $C_2$ to $C_{15}$ alkylene group.

* * * * *